United States Patent
Hashimoto et al.

(10) Patent No.: US 8,232,777 B2
(45) Date of Patent: Jul. 31, 2012

(54) INVERTER GENERATOR

(75) Inventors: Shoji Hashimoto, Saitama (JP); Kazufumi Muronoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 12/504,457

(22) Filed: Jul. 16, 2009

(65) Prior Publication Data

US 2010/0019740 A1    Jan. 28, 2010

(30) Foreign Application Priority Data

Jul. 25, 2008  (JP) ................. 2008-191779

(51) Int. Cl.
*H02P 11/00* (2006.01)
*H02P 9/00* (2006.01)

(52) U.S. Cl. ........................ 322/37; 322/44

(58) Field of Classification Search ............ 322/37, 322/44, 24, 28; 363/41, 39
See application file for complete search history.

(56) References Cited

U.S. PATENT DOCUMENTS

| | | | | |
|---|---|---|---|---|
| 4,977,492 A | * | 12/1990 | Kirchberg et al. | 363/41 |
| 5,138,247 A | * | 8/1992 | Tanoue et al. | 323/207 |
| 5,321,599 A | * | 6/1994 | Tanamachi et al. | 363/41 |
| 5,327,335 A | | 7/1994 | Maddali et al. | |
| 5,586,018 A | * | 12/1996 | Aoyama et al. | 363/41 |
| 6,130,486 A | * | 10/2000 | Shimizu et al. | 290/40 C |
| 6,134,127 A | | 10/2000 | Kirchberg | |
| 2004/0120167 A1 | * | 6/2004 | Nakamura et al. | 363/37 |
| 2006/0202559 A1 | * | 9/2006 | Hashimoto et al. | 307/64 |

FOREIGN PATENT DOCUMENTS

| | | |
|---|---|---|
| EP | 0 555 557 A1 | 8/1993 |
| JP | 04-355672 A | 12/1992 |
| JP | 11-308896 A | 11/1999 |

* cited by examiner

*Primary Examiner* — Julio Gonzalez
(74) *Attorney, Agent, or Firm* — Arent Fox LLP

(57) ABSTRACT

In an inverter generator having an engine generator unit generating alternating current, a converter converting the alternating current to direct current, an inverter that converts the direct current to alternating current, an inverter driver that drives switching elements with a PWM signal generated using a reference sine wave of a desired output voltage waveform and a carrier and makes the alternating current to the alternating current of a predetermined frequency, the alternating current supplied to an electrical load is detected, gains Gn (n: 2, 3, 4, 5, 6, . . . m) of n-th harmonics of the reference sine wave and amplitudes An are calculated from the detected current, and the reference sine wave is corrected by a sum obtained by the calculated gains and amplitudes. With this, the reference sine wave is accurately corrected to reliably remove harmonic distortion components from the output voltage waveform.

10 Claims, 6 Drawing Sheets

FIG. 7

| CURRENT(A) | 0 | 5 | 10 | 15 | 20 | ... |
|---|---|---|---|---|---|---|
| 2ND HARMONIC GAIN | 0 | 0.4 | 0.4 | 0.4 | 0.4 | ... |

| CURRENT(A) | 0 | 5 | 10 | 15 | 20 | ... |
|---|---|---|---|---|---|---|
| 3RD HARMONIC GAIN | 0 | 0.2 | 0.2 | 0.2 | 0.2 | ... |

| CURRENT(A) | 0 | 5 | 10 | 15 | 20 | ... |
|---|---|---|---|---|---|---|
| 5TH HARMONIC GAIN | 0 | 0.1 | 0.1 | 0.1 | 0.1 | ... |

FIG. 8

| STEP | REFERENCE | 2ND | 3RD | 5TH | HARMONIC CORRECTION TERM AT 20(A) |
|---|---|---|---|---|---|
| 0 | 0 | 0 | 0 | 0 | 0 |
| 1 | 16 | 32 | 48 | 80 | 30.54746 |
| 2 | 32 | 64 | 96 | 160 | 61.01127 |
| 3 | 48 | 96 | 144 | 239 | 91.30814 |
| 4 | 64 | 128 | 192 | 316 | 121.3555 |
| 5 | 80 | 160 | 239 | 392 | 151.0720 |
| 6 | 96 | 192 | 286 | 465 | 180.3774 |
| 7 | 112 | 223 | 332 | 535 | 209.1936 |
| . | . | . | . | . | . |

INVERTER GENERATOR

CROSS-REFERENCE TO RELATED APPLICATION

This application claims the priority of Japanese Application No. 2008-191779, filed Jul. 25, 2008, the entire specification, claims and drawings of which are incorporated herewith by reference.

BACKGROUND OF THE INVENTION

1. Field of the Invention

This invention relates to an inverter generator, particularly to an inverter generator equipped with a generator unit driven by an internal combustion engine and adapted to remove harmonic distortion from the alternating current output to the utmost possible.

2. Description of the Related Art

One well-known inverter generator once converts the alternating current outputted by an engine-driven generator unit to direct current and then converts the direct current into alternating current of a predetermined frequency (utility frequency) by driving switching elements with a PWM signal generated using a reference sine wave of the desired output voltage waveform and a carrier (carrier wave). An example of such an inverter generator can be found in Japanese Laid-Open Patent Application No. H4 (1992)-355672 ('672).

In the prior art taught by this publication, the AC output voltage waveform is brought close to a sine wave by detecting the output voltage difference at the midpoint of four switching elements and correcting the reference sine wave in accordance therewith before supplying it to a pulse width modulation circuit for generating the PWM signal.

SUMMARY OF THE INVENTION

Although the aforesaid configuration according to '672 enables removal of output voltage waveform distortion, it does not necessarily enable adequate reduction of harmonic distortion components.

This invention is therefore directed to overcoming the aforesaid problem by providing an inverter generator that conducts conversion to alternating current of a predetermined frequency based on a PWM signal generated using a reference sine wave of the desired output voltage waveform and a carrier, wherein the reference sine wave is accurately corrected to reliably remove harmonic distortion components from the output voltage waveform.

In order to achieve the object, this invention provides in its first aspect an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier and makes the alternating current converted in the inverter to the alternating current of a predetermined frequency, comprising: a current detector that detects the alternating current supplied to the electrical load; a gain calculator that calculates gains Gn (n: 2, 3, 4, 5, 6, . . . m) of n-th harmonics of the reference sine wave based on the detected current; and a reference sine wave corrector that corrects the reference sine wave by a sum obtained by the calculated gains Gn.

In order to achieve the object, this invention provides in its second aspect a method of controlling an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier and makes the alternating current converted in the inverter to the alternating current of a predetermined frequency, comprising the steps of: detecting the alternating current supplied to the electrical load; calculating gains Gn (n: 2, 3, 4, 5, 6, . . . m) of n-th harmonics of the reference sine wave based on the detected current; and correcting the reference sine wave by a sum obtained by the calculated gains Gn.

BRIEF DESCRIPTION OF THE DRAWINGS

The above and other objects and advantages of the invention will be more apparent from the following description and drawings in which:

FIG. 7 is an explanatory view showing table values of gains of harmonic amplitudes used in the flowchart of FIG. 4; and FIG. 8 is an explanatory view showing elements of harmonic correction terms calculated in the flowchart of FIG. 4.

DETAILED DESCRIPTION OF THE PREFERRED EMBODIMENT

An inverter generator according to an embodiment of this invention will now be explained with reference to the attached drawings.

Figure 1:
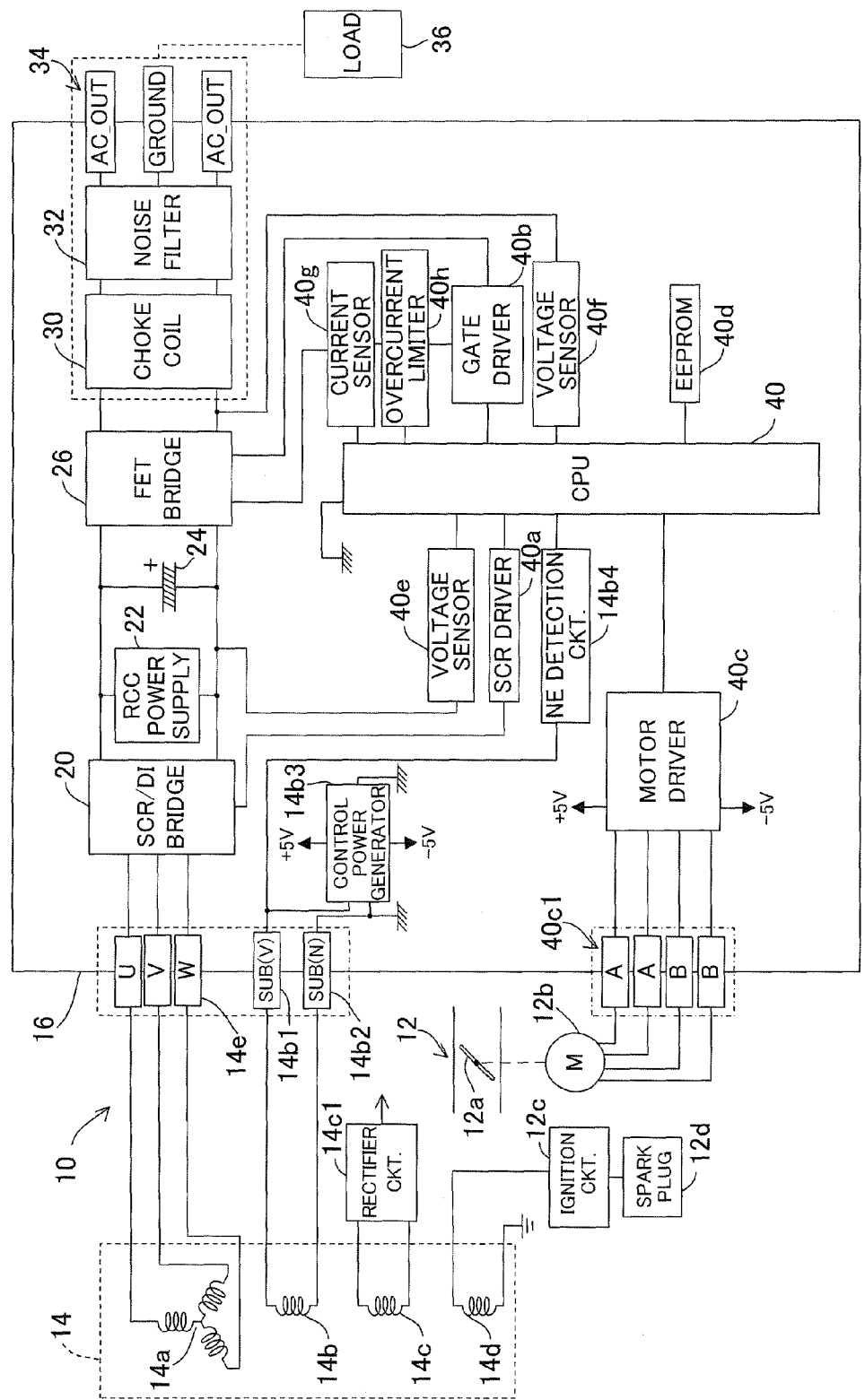
FIG. 1 is a block diagram giving an overview of an inverter generator according to an embodiment of this invention.

FIG. 1 is a block diagram giving an overview of an inverter generator according to an embodiment of this invention.

The inverter generator is designated by reference numeral 10 in FIG. 1. The generator 10 is equipped with an engine (internal combustion engine) 12 and has a rated output of about 3 kW (AC 100 V, 30 A). The engine 12 is an air-cooled, spark-ignition engine. Its throttle valve 12a is opened and closed by a throttle motor (actuator) 12b constituted as a stepper motor. The engine 12 is started with a recoil starter (not shown).

A circular stator (not shown) is fastened near the cylinder head of the engine 12. The stator is provided with windings that constitute an engine generator unit 14, namely with three-phase (U, V and W) output windings (main windings) 14a and three single-phase windings 14b, 14c and 14d.

A rotor (not shown) that doubles as the flywheel of the engine 12 is installed in the outside of the stator. Permanent magnets (not shown) are attached in the rotor at positions opposite the aforesaid windings 14a etc. and with their radially oriented polarities reversed alternately.

When the permanent magnets of the rotor surrounding the stator rotate, three-phase (U, V and W phase) alternating current is outputted from (generated by) the three-phase output windings 14a and single-phase alternating current is outputted from the single-phase output windings 14b, 14c and 14d.

The three-phase alternating current outputted from (generated by) the output windings 14a of the generator unit 14 is passed through U, V and W terminals 14e to a control board (printed board) 16 and inputted to a converter 20 mounted thereon. The converter 20 is equipped with bridge-connected three thyristors (SCRs) and three diodes DI. The three-phase alternating current outputted by the generator unit 14 is converted to direct current by controlling the turn-on or conducting angles of the thyristors.

A ringing choke converter (RCC) power supply (direct current stabilized power supply) 22 is connected to the positive and negative electrode side outputs of the converter 20 and supplies the rectified DC power to the three thyristors as operating power. A smoothing capacitor 24 is connected downstream of the RCC power supply 22 to smooth the direct current outputted from the converter 20.

An inverter 26 is connected downstream of the smoothing capacitor 24. The inverter 26 is equipped with a four-FET bridge circuit (FET: field effect transistor (switching element)). As explained further below, the direct current outputted from the converter 20 is converted to alternating current of a predetermined frequency (50 Hz or 60 Hz utility power frequency) by controlling the conducting (ON-OFF) state of the four FETs.

The output of the inverter 26 is passed through a choke coil 30 composed of an LC filter for harmonic suppression and through a noise filter 32 for noise suppression to output terminals 34, from which it can be supplied to an electrical load 36 through a connector (not shown) or the like.

The control board 16 is equipped with a CPU (central processing unit) 40 having a 32-bit architecture. The CPU 40 controls the turn-on angle of the thyristors of the converter 20 though a thyristor (SCR) driver (drive circuit) 40a, the turn-on or turn-off of the FETs of the inverter 26 through a gate driver 40b, and the operation of the throttle motor 12b through a motor driver 40c. The CPU 40 is equipped with an EEPROM (nonvolatile memory) 40d.

The output of the first single-phase output winding 14b is sent to the control board 16 through sub-terminals 14b1 and 14b2, where it is inputted to a control power generator 14b3 that generates 5 V operating power for the CPU 40. The output from the sub-terminal 14b1 is sent to an NE detection circuit 14b4, where it is converted to a pulse signal and sent to the CPU 40. The CPU 40 counts the pulses of the output from the NE detection circuit 14b4 to calculate (detect) the speed NE of the engine 12.

The output of the second output winding 14c is sent to a full-wave rectifier circuit 14c1, where it is full-wave rectified to produce operating power for the throttle motor 12b, etc. The output of the third output winding 14d is sent to an ignition circuit 12c of the engine 12 for use as ignition power for a spark plug 12d.

The CPU 40 is connected to first and second voltage sensors 40e and 40f. The first voltage sensor 40e on downstream of the RCC power supply 22 produces an output or signal proportional to the DC voltage output of the converter 20. The second voltage sensor 40f on downstream of the inverter 26 produces an output or signal proportional to the AC voltage output of the inverter 26. The outputs of the first and second voltage sensors 40e and 40f are sent to the CPU 40.

The CPU 40 is further connected with a current sensor 40g. The current sensor 40g produces an output or signal proportional to the current outputted from the inverter 26, i.e., the current passing through the electrical load 36 when the load 36 is connected.

The output of the current sensor 40g is inputted to the CPU 40 and also to an overcurrent limiter 40h. When the current detected by the current sensor 40g exceeds the tolerance limit, the overcurrent limiter 40h terminates the output of the gate driver 40b to make the output of the inverter 26 zero temporarily.

Figure 2:
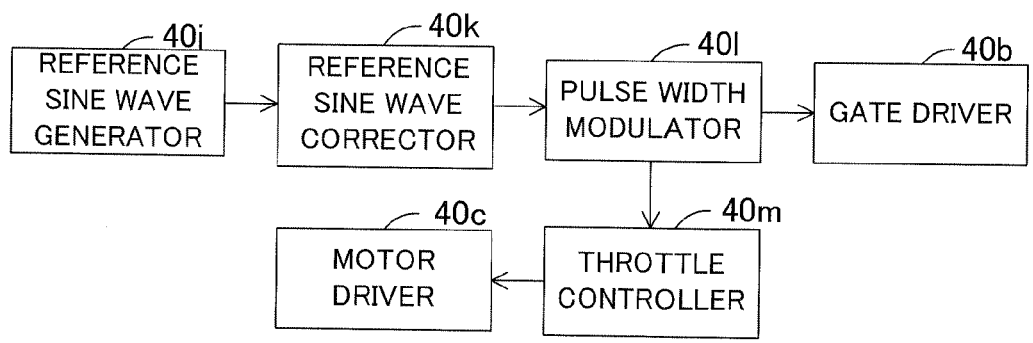
FIG. 2 is a block diagram functionally showing the operation of a CPU shown in FIG. 1.

FIG. 2 is a block diagram functionally showing the operation of the CPU 40.

As shown in FIG. 2, the CPU 40 is equipped with a reference sine wave generator 40j, a reference sine wave corrector 40k, a pulse width modulator 40l, and a throttle controller 40m.

Figure 3:
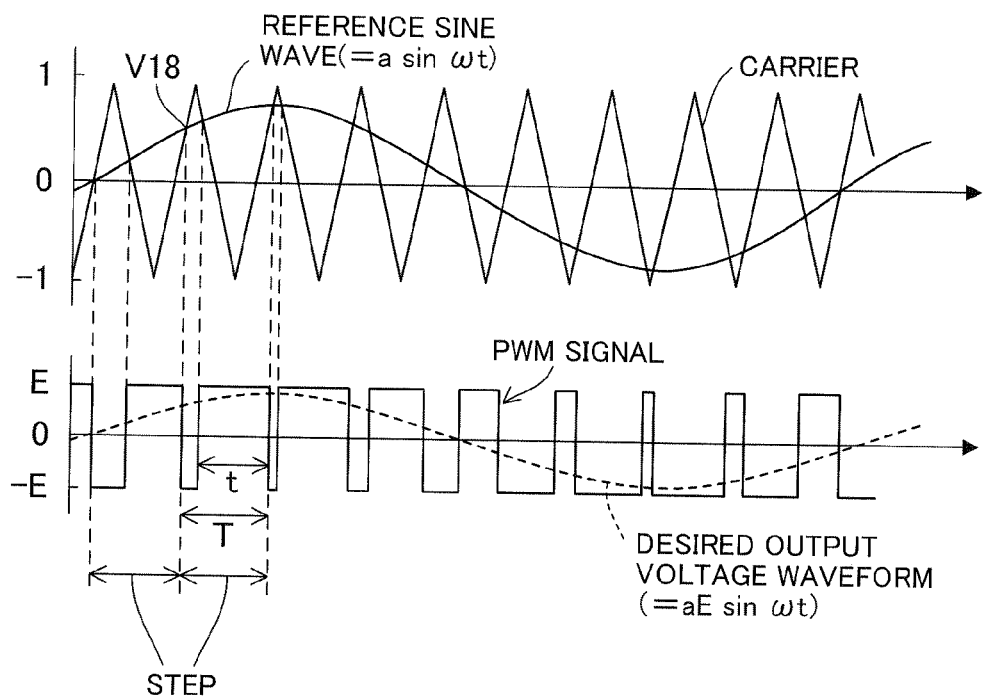
FIG. 3 is a waveform diagram showing the operation of a reference sine wave generator and the like of FIG. 2.

FIG. 3 is a waveform diagram showing the operation of the reference sine wave generator and the like of FIG. 2.

As shown in FIG. 3, the reference sine wave generator 40j produces a reference sine wave (signal wave; upper solid-line wave) of the predetermined frequency (i.e., 50 Hz or 60 Hz utility power frequency) of the desired output voltage waveform. As explained further below, the reference sine wave corrector 40k corrects the reference sine wave produced by the reference sine wave generator 40j.

As also shown in FIG. 3, the pulse width modulator 40l is inputted with the reference sine wave produced by the reference sine wave generator 40j or corrected by the reference sine wave corrector 40k, uses a comparator (not shown) to compare it with a carrier (e.g., a 20 kHz carrier wave), and produces a PWM signal (PWM waveform), namely a variable duty ratio (=ON time t/period T) pulse train, in accordance with PWM (pulse width modulation).

The lower broken-line wave in FIG. 3 indicates the desired output voltage waveform. The period T (step) of the PWM signal (PWM waveform), which is actually much shorter than shown, is enlarged in FIG. 3 for ease of understanding.

The throttle controller 40m determines the opening of the throttle valve 12a to establish the desired engine speed calculated based on the AC output determined by the electrical load 36, calculates A phase and B phase output pulses for the throttle motor comprising a stepper motor 12b, and supplies them through the motor driver 40c to the throttle motor 12b from output terminals 40c1, thereby controlling the operation of the throttle motor 12b.

Now follows an explanation of the operation of the CPU 40, specifically the operation of the reference sine wave corrector 40k and pulse width modulator 40l.

Figure 4:
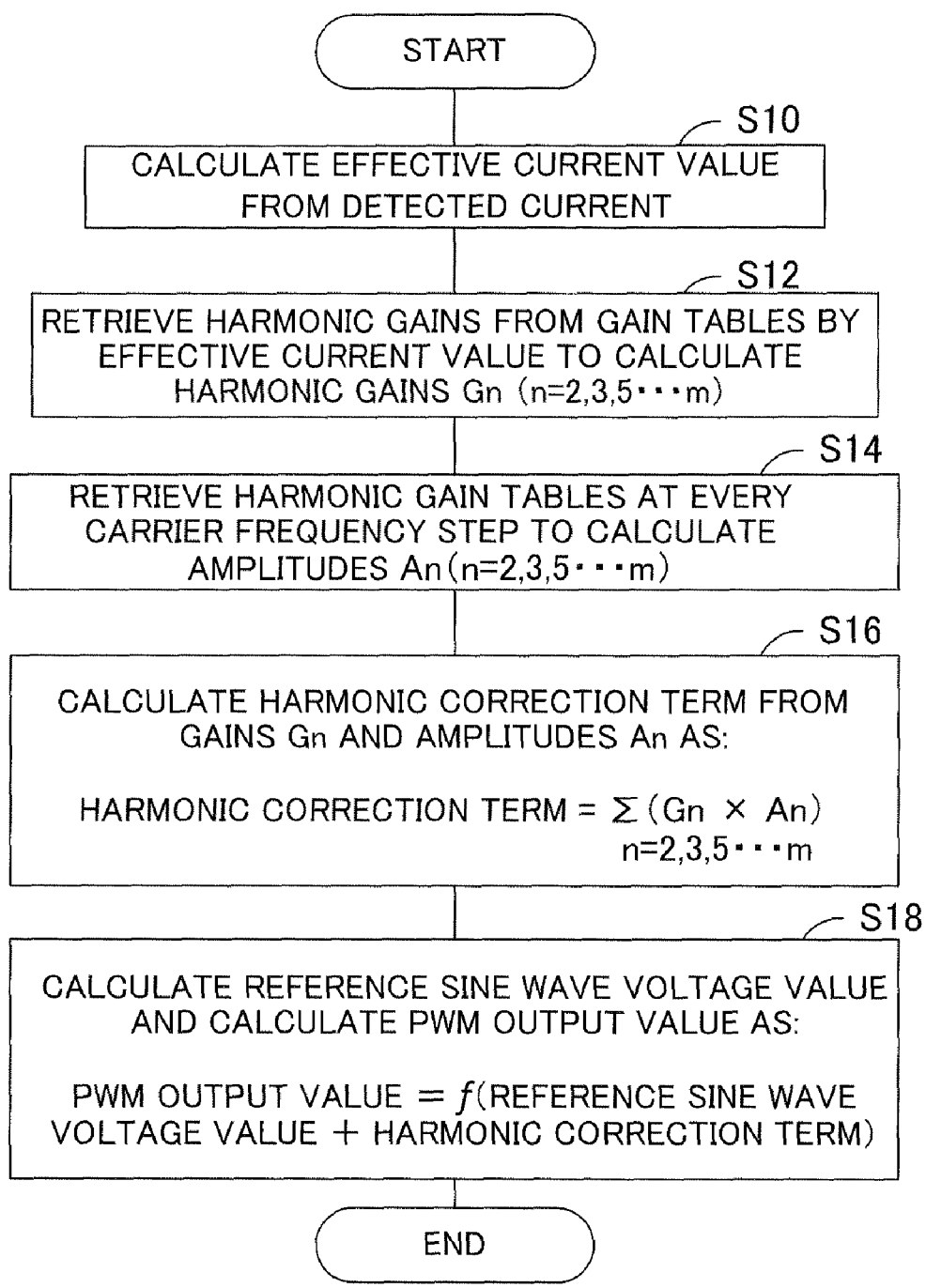
FIG. 4 is a flowchart showing a reference sine wave corrector and the like of FIG. 2.

FIG. 4 is a flowchart showing these operations. The illustrated program is executed at predetermined times, for example every 50 microseconds in the case where the frequency of the output voltage waveform is 50 Hz.

The program begins in S10, in which the effective value of the current value detected by the current sensor 40g, i.e., the root-mean-square value of the detected value (instantaneous value) is calculated.

The program next proceeds to S12, in which the calculated current effective value is used to calculate the harmonic gains $G_n$ ($n=2, 3, 5 \ldots m$) by retrieval from harmonic gain tables, whereafter the program proceeds to S14, in which amplitudes $A_n$ ($n=2, 3, 5 \ldots m$) are calculated (retrieved) from the harmonic tables every step of the carrier frequency (20 kHz)

(FIG. 3), and to S16, in which a harmonic correction term is calculated from the calculated gains Gn and amplitudes An using the arithmetic expression shown in FIG. 4. It should be noted here that among of $2^{nd}$, $3^{rd}$, $4^{th}$, $5^{th}$, $6^{th}$, ... higher harmonics, the $2^{nd}$, $3^{rd}$, and $5^{th}$ ones are used as examples.

Figure 5:
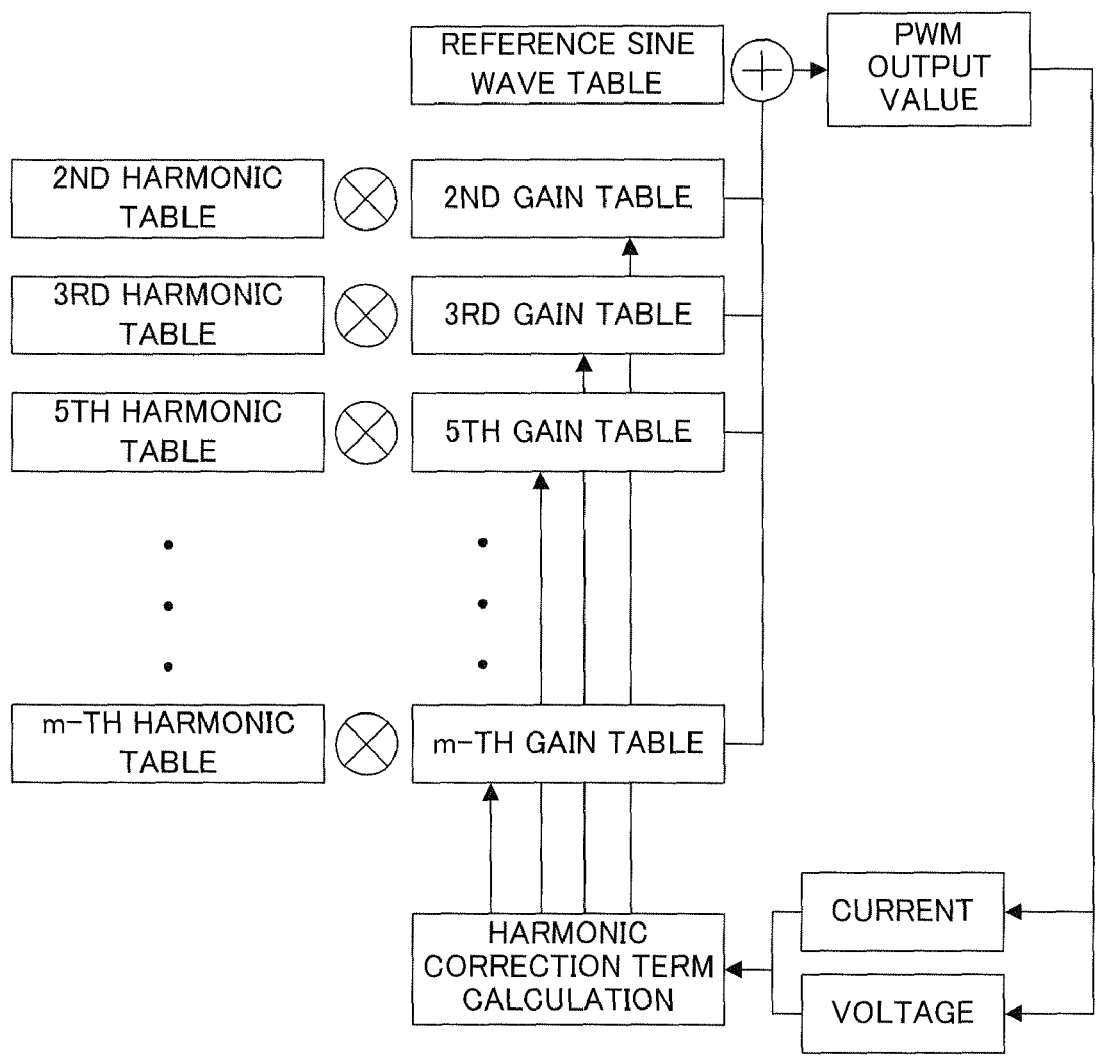
FIG. 5 is a block diagram showing the configuration of the reference sine wave corrector shown in FIG. 2, for explaining the processing of the flowchart of FIG. 4.

FIG. 5 is a block diagram showing the configuration of the reference sine wave corrector 40k, for use in explaining the processing to the flowchart of FIG. 4.

As illustrated, the reference sine wave corrector 40k is provided with a reference sine wave table, n-th, i.e., 2nd, 3rd, 5th to m-th harmonic tables, and harmonic gain tables associated with the harmonic tables. The reference sine wave table and other tables are all stored in the EEPROM 40d.

Figure 6:
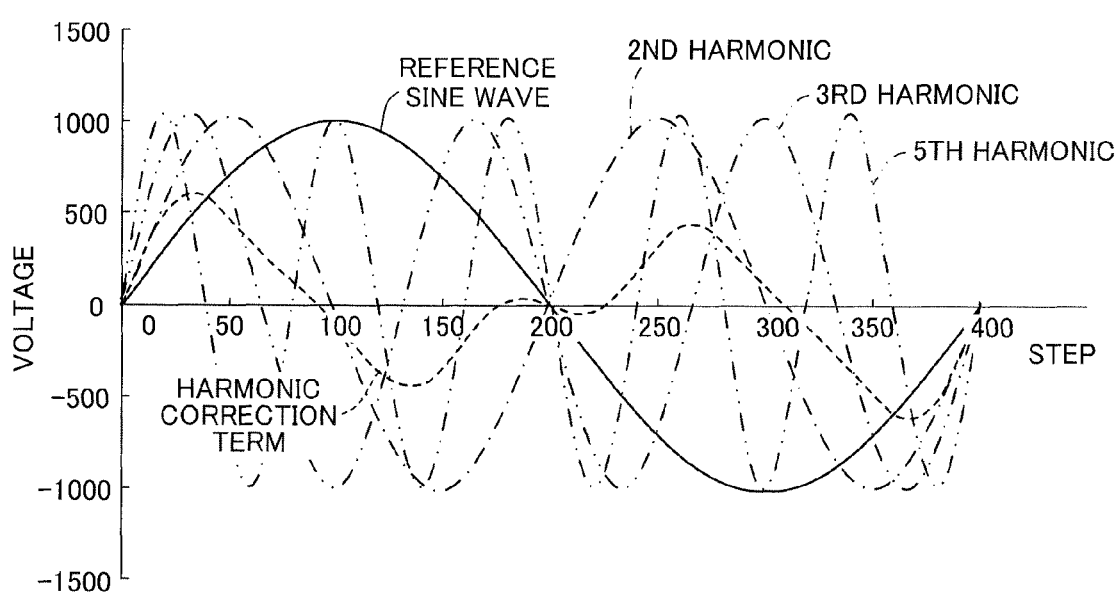
FIG. 6 is a waveform diagram showing, inter alia, a reference sine wave generated in the reference sine wave generator shown in FIG. 2.

As shown in FIG. 6, the data of the reference sine wave table are stored every predetermined time interval of each of the two frequencies of the reference sine wave (50 Hz and 60 Hz utility power frequencies), i.e., are stored dividedly in 400 steps (time points). It will be noted from FIG. 6 that the output voltage amplitude (maximum value) is, for convenience of calculation, represented as 1,024, i.e., 2 to the power of 10 (128 bytes).

Similarly, as shown in FIG. 6, the amplitudes An (n=2, 3, 5 ... m) of the respective harmonics are dividedly stored in the 2nd, 3rd, 5th to m-th harmonic tables in 400 steps. For ready understanding, the harmonics are shown to have the same amplitude as the reference sine wave.

As shown in FIG. 7, the gains Gn (n=2, 3, 5 ... m) are stored in the 2nd, 3rd, 5th to m-th gain tables as values that can be retrieved using the current (A), more exactly the calculated current effective value (A). Gain is represented as a fraction (percentage) of harmonic amplitude (magnitude).

Therefore, the calculated current effective value is used to retrieve data from the gain and other tables in the processing from S12 through S16, and the amplitudes An corresponding to the step associated with the time of execution of the flowchart of FIG. 4 are retrieved from the harmonic and other tables.

Next, as shown below, the harmonic correction term is calculated from the retrieved gains Gn and amplitudes An in accordance with the indicated arithmetic expression:

Harmonic correction term=$A2 \times G2 + A3 \times G3 + A5 \times G5 \ldots Am \times Gm$.

The 2nd to 5th values of the harmonic correction term are shown in FIG. 8. FIG. 6 shows the waveform of the harmonic correction term when it is made continuous for one period of the reference sine wave.

Returning to he explanation of the flowchart of FIG. 4, the program next proceeds to S18, in which the reference sine wave voltage value, e.g., the value indicated as V18 in FIG. 3, is calculated and, as shown by the arithmetic expression, the sum of the reference sine wave voltage value and the harmonic correction term is calculated and the PWM output value (PWM signal) is calculated based on the so-obtained sum.

Thus, the reference sine wave voltage value corresponding to the step associated with the time of execution of the flowchart of FIG. 4 is retrieved, and the sum obtained by adding the retrieved value and the harmonic correction term (product of the calculated harmonic amplitude An and the gain Gn) is used to correct the reference sine wave (its voltage value). Up to here is the processing conducted by the reference sine wave corrector 40k.

Next, the pulse width modulator 40l receives the reference sine wave voltage value corrected by the reference sine wave corrector 40k (the sum of the reference sine wave voltage value and the harmonic correction term), compares it with the carrier using a comparator, and calculates (produces) a PWM output value (PWM signal or PWM waveform).

The calculated PWM output value is outputted from the gate driver 40b to the FET bridge circuit of FIG. 1 and the turn-on or turn-off of the four FETs is controlled to output from the output terminals 34 alternating current of the predetermined frequency of 50 Hz (or 60 Hz) for supply to the electrical load 36 as required.

This processing will be explained with reference to FIG. 6. When the PWM signal is calculated by using a comparator to compare a reference sine wave like the illustrated one with the carrier, the so-obtained output voltage waveform should be a waveform that, similarly to the reference sine wave, has no distortion, as shown by the broken-line curve in FIG. 3.

Actually, however, the output voltage waveform comes to deviate from the desired reference sine wave waveform owing to time lag, temperature and the like at the time of the FET control and, as a result, harmonics like those in FIG. 6 occur.

Therefore, in this embodiment an off-line computer is used to Fourier transform the harmonics that would occur with respect to the reference sine wave voltage waveform shown in FIG. 6 depending on the current passed through the electrical load 36 for subjecting to frequency analysis, amplitude and gain data are generated from the analytical results in advance, and the generated data are prepared as table data that can be retrieved using the current value.

Among these data, the gains Gn are calculated so as to cancel the harmonics. More specifically, if the amplitude A2 of the second harmonic occurs on the positive side, the gain G2 is calculated on the negative side so as to cancel the amplitude A2, and if the amplitude A3 of the third harmonic occurs on the negative side, the gain G3 is calculated on the positive side so as to cancel the amplitude A3. Next, the reference sine wave (its voltage value) is corrected by the harmonic correction term obtained by summing the products of the harmonic amplitudes An and gains Gn.

The aforesaid configuration of this embodiment enables accurate correction of the reference sine wave. As a result, the harmonic distortion components can be reliably removed from the output voltage waveform by generating the PWM signal using the corrected reference sine wave.

The storage means (EEPROM) 40d is provided for storing the gains of the n-th harmonics of the reference sine wave as table values and the gains Gn are calculated by retrieval from the tables using the detected current value. Therefore, in addition to providing the foregoing advantages, this configuration further enables ready calculation of the gains Gn.

As set out in the foregoing, this embodiment is configured to have an inverter generator (10) (and a method of controlling the inverter generator (10)) having a generator unit (14) that is driven by an internal combustion engine (12) and generates alternating current, a converter (20) that is connected to the generator unit (14) and converts the alternating current to direct current, an inverter (26) that is connected to the converter (20) and converts the direct current to alternating current with switching elements to supply to an electrical load, an inverter driver (CPU 40) that drives the switching elements with a PWM signal generated using a reference sine wave of a desired output voltage waveform and a carrier and makes the alternating current converted in the inverter to the alternating current of a predetermined frequency, characterized by: a current detector (CPU 40, current sensor 40g, S10) that detects the alternating current supplied to the electrical load (36); a gain calculator (CPU 40, S12) that calculates gains Gn (n: 4, 5, 6, ... m) of n-th harmonics of the reference sine wave based on the detected current; and a reference sine wave corrector (CPU 40, reference sine wave corrector 40k, S14 to S18) that corrects the reference sine wave by a sum (harmonic correction term) obtained by the calculated gains Gn.

In the inverter generator, the gains Gn are prepared as table data (in a memory (EEPROM 40d), and the gain calculator calculates the gain Gn by retrieving the table data by the detected current (S12).

In the inverter generator, the gain calculator calculates amplitude An (n: 2, 3, 5, . . . m) of n-th harmonics of the reference sine wave, and the reference sine wave corrector that corrects the reference sine wave by summing products of the calculated gains Gn and amplitudes An (S14).

In the inverter, the amplitude An are prepared as table data together with the gains Gn, and the gain calculator calculates the amplitude An by retrieving the table data (S12, S14).

In the inverter generator, the current detector detects the current as an effective value based on an detected value obtained by a current sensor (40g).

Although FETs are used as the switching elements of the inverter in the foregoing, this is not a limitation and it is possible to use insulated gate bipolar transistors (IGBTs) or the like instead.

Japanese Patent Application No. 2008-191779 filed on Jul. 25, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier and makes the alternating current converted in the inverter to the alternating current of a predetermined frequency, comprising:
    a current detector that detects the alternating current supplied to the electrical load;
    a gain calculator that calculates gains Gn (n: 2, 3, 4, 5, 6, . . . m) of n-th harmonics of the reference sine wave based on the detected current; and
    a reference sine wave corrector that corrects the reference sine wave by a sum obtained by the calculated gains Gn.

2. The inverter generator according to claim 1, wherein the gains Gn are prepared as table data, and the gain calculator calculates the gain Gn by retrieving the table data by the detected current.

3. The inverter generator according to claim 1, wherein the gain calculator calculates amplitude An (n: 2, 3, 4, 5, 6, . . . m) of n-th harmonics of the reference sine wave, and the reference sine wave corrector that corrects the reference sine wave by summing products of calculated gains Gn and amplitudes An.

4. The inverter generator according to claim 3, wherein the amplitude An are prepared as table data together with the gains Gn, and the gain calculator calculates the amplitude An by retrieving the table data.

5. The inverter generator according to claim 1, wherein the current detector detects the current as an effective value based on an detected value obtained by a current sensor.

6. A method of controlling an inverter generator having a generator unit that is driven by an internal combustion engine and generates alternating current, a converter that is connected to the generator unit and converts the alternating current to direct current, an inverter that is connected to the converter and converts the direct current to alternating current with switching elements to supply to an electrical load, an inverter driver that drives the switching elements with a PWM signal generated using a reference sine wave of a desired output voltage waveform and a carrier and makes the alternating current converted in the inverter to the alternating current of a predetermined frequency, comprising the steps of:
    detecting the alternating current supplied to the electrical load;
    calculating gains Gn (n: 2, 3, 4, 5, 6, . . . m) of n-th harmonics of the reference sine wave based on the detected current; and
    correcting the reference sine wave by a sum obtained by the calculated gains Gn.

7. The method according to claim 6, wherein the gains Gn are prepared as table data, and the step of gain calculation calculates the gain Gn by retrieving the table data by the detected current.

8. The method according to claim 6, wherein the step of gain calculation calculates amplitude An (n: 2, 3, 4, 5, 6, . . . m) of n-th harmonics of the reference sine wave, and the reference sine wave corrector that corrects the reference sine wave by summing products of the calculated gains Gn and amplitudes An.

9. The method according to claim 8, wherein the amplitude An are prepared as table data together with the gains Gn, and the step of gain calculation calculates the amplitude An by retrieving the table data.

10. The method according to claim 6, wherein the step of current detecting detects the current as an effective value based on an detected value obtained by a current sensor.

* * * * *